Jan. 16, 1951     A. E. RUTTER     2,538,594
TRACTOR DRAWN DISK HARROW

Filed Aug. 18, 1944     3 Sheets-Sheet 1

INVENTOR.
ALVAH E. RUTTER
BY
William F. Buckley.
ATTORNEY.

Jan. 16, 1951  A. E. RUTTER  2,538,594
TRACTOR DRAWN DISK HARROW

Filed Aug. 18, 1944  3 Sheets—Sheet 2

INVENTOR.
ALVAH E. RUTTER
BY William F. Buckley
ATTORNEY.

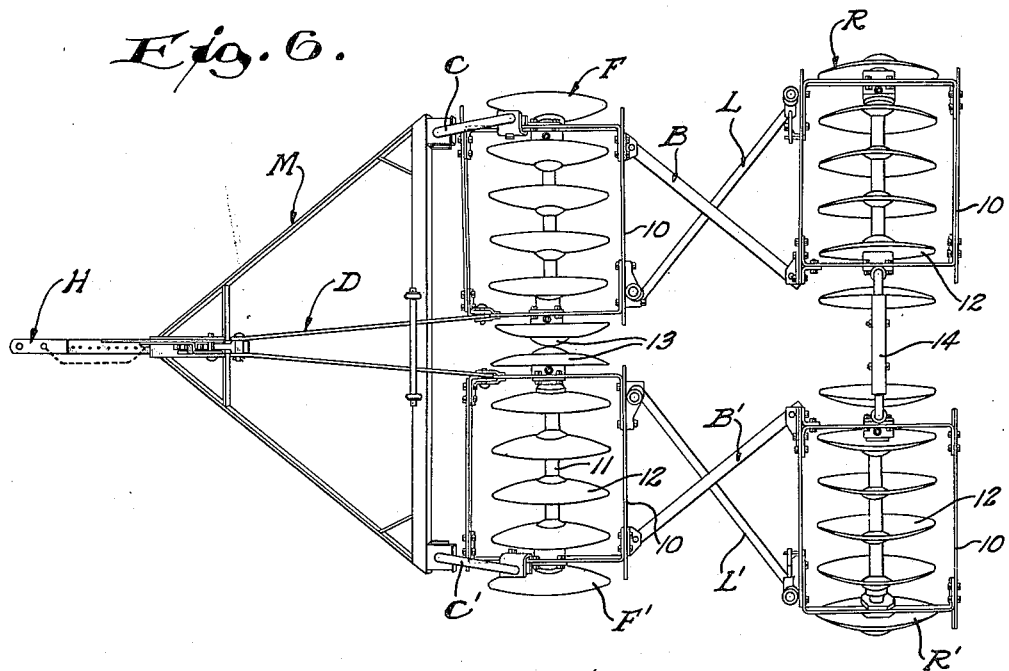
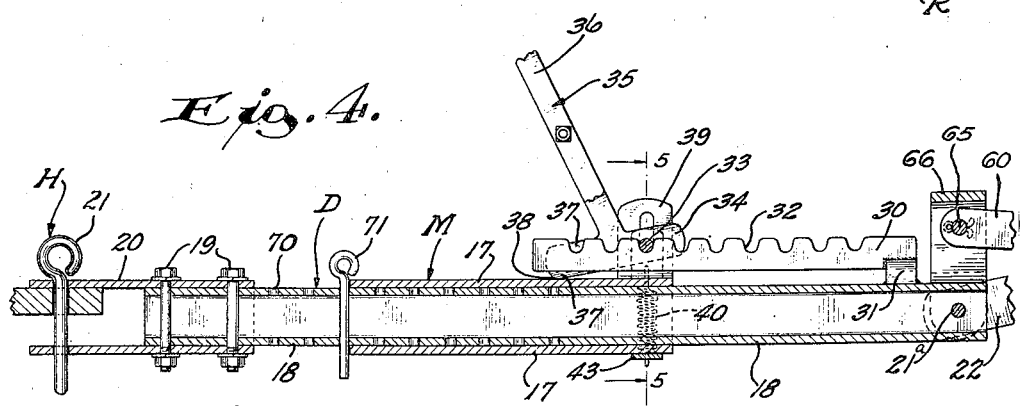
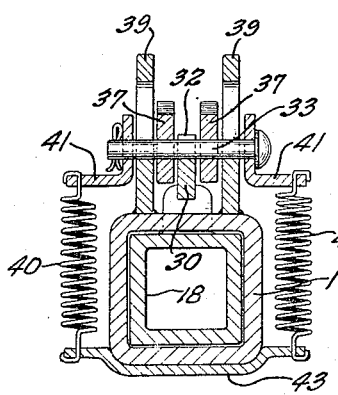

Patented Jan. 16, 1951

2,538,594

UNITED STATES PATENT OFFICE 2,538,594

TRACTOR DRAWN DISK HARROW

Alvah E. Rutter, Rockford, Ill., assignor to J. I. Case Company, Racine, Wis., a corporation of Wisconsin Application August 18, 1944, Serial No. 549,986

14 Claims. (Cl. 55—83)

This invention relates to an improvement in tractor drawn disk harrows.

An object of the invention is to provide an agricultural implement of this character wherein novel and advantageous provision is made for shifting the gangs of the harrow disks from tilling to transport position under the power of the tractor, and for releasably securing the gangs in transport position or in any selected tilling position.

Another object of the invention is to provide simple, closely organized and compact automatic mechanism for quickly or abruptly raising the center tooth when the gangs of the disk harrow are shifted to transport position so that the tooth will not dig into the ground when the harrow is being transported, and yet the construction is such that the center tooth is free efficiently to exercise its proper function when the gangs are in tilling position.

Another object of the invention is to provide a construction and organization of the main frame, draw bar and gangs of such character that the draw bar overlies the transverse element of the main frame in cooperative relation to an appropriately constructed and organized hold-down to minimize the tendency of the ground reactions to cause the gangs to run too deep at their outer ends and too shallow at the center.

A further object of the invention is to provide stop or gauge means for selectively limiting the relative movement of the draw bar with respect to the main frame in the tilling position of the gangs so that when the proper degree of angle for any particular operation is established, it may be re-established after transport semi-automatically.

These objects of the invention and other ancillary advantages are attained by the mechanism, construction, and arrangement illustrated in the accompanying drawings forming part hereof, in which:

Fig. 4 is a fragmentary view in longitudinal vertical cross section taken on line 4—4 of Fig. 1;

Fig. 5 is a view in transverse vertical cross section taken on line 5—5 of Fig. 4;

Fig. 6 is a plan view illustrating a tractor drawn harrow embodying the present invention, the center tooth being omitted for the sake of simplicity in illustration; and Fig. 7 is a detail view in elevation of the manually operable lever for controlling the latch pin which releasably secures the draw bar and main frame in any selected adjustment.

Figure 1:
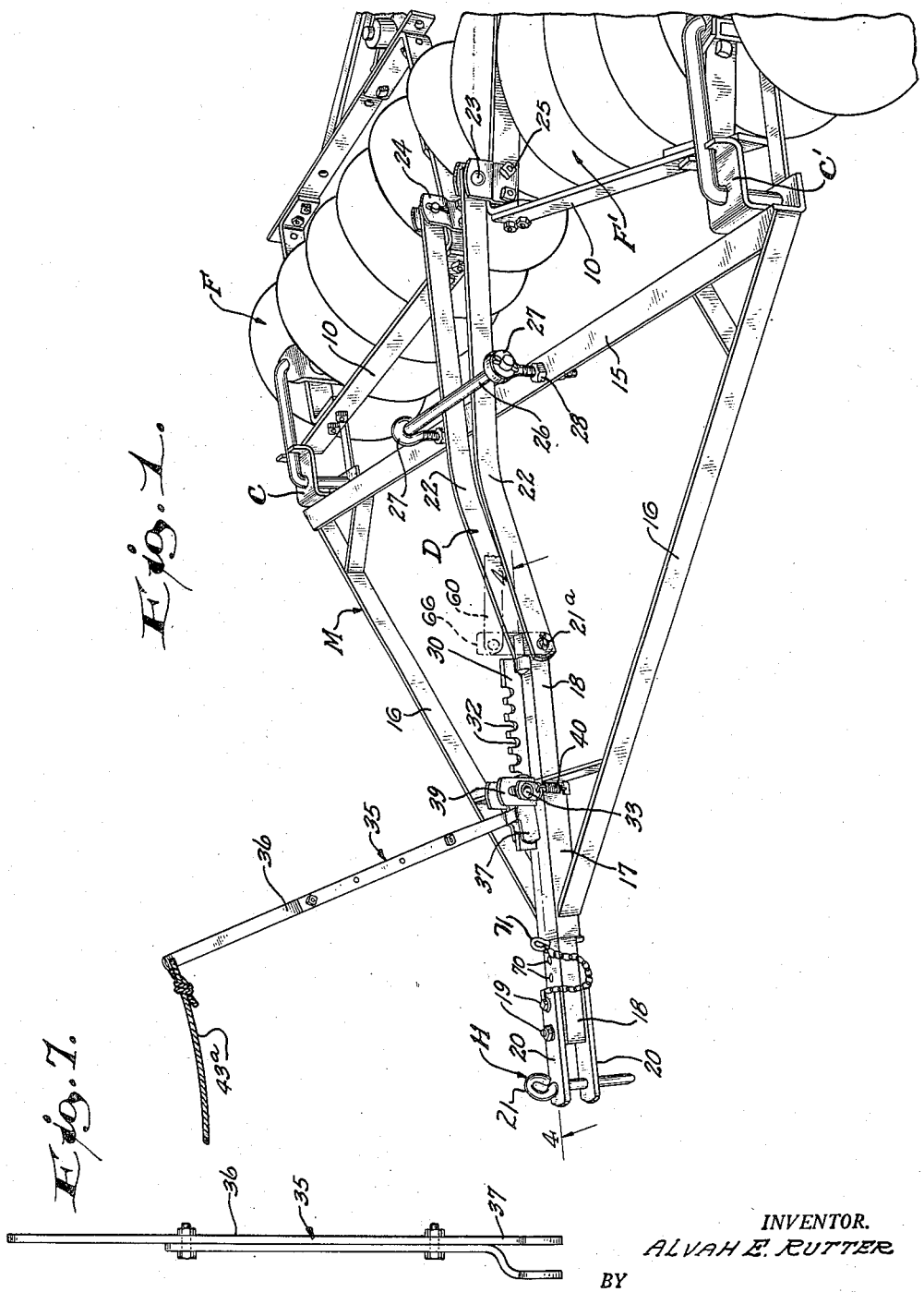
Fig. 1 is a fragmentary perspective view illustrating a tractor drawn harrow embodying the present invention, the view showing the main frame, the draw bar, its hitch, the manually operable means for releasably securing the draw bar and main frame in relative adjustments, and a large portion of the front gangs.
Figure 2:
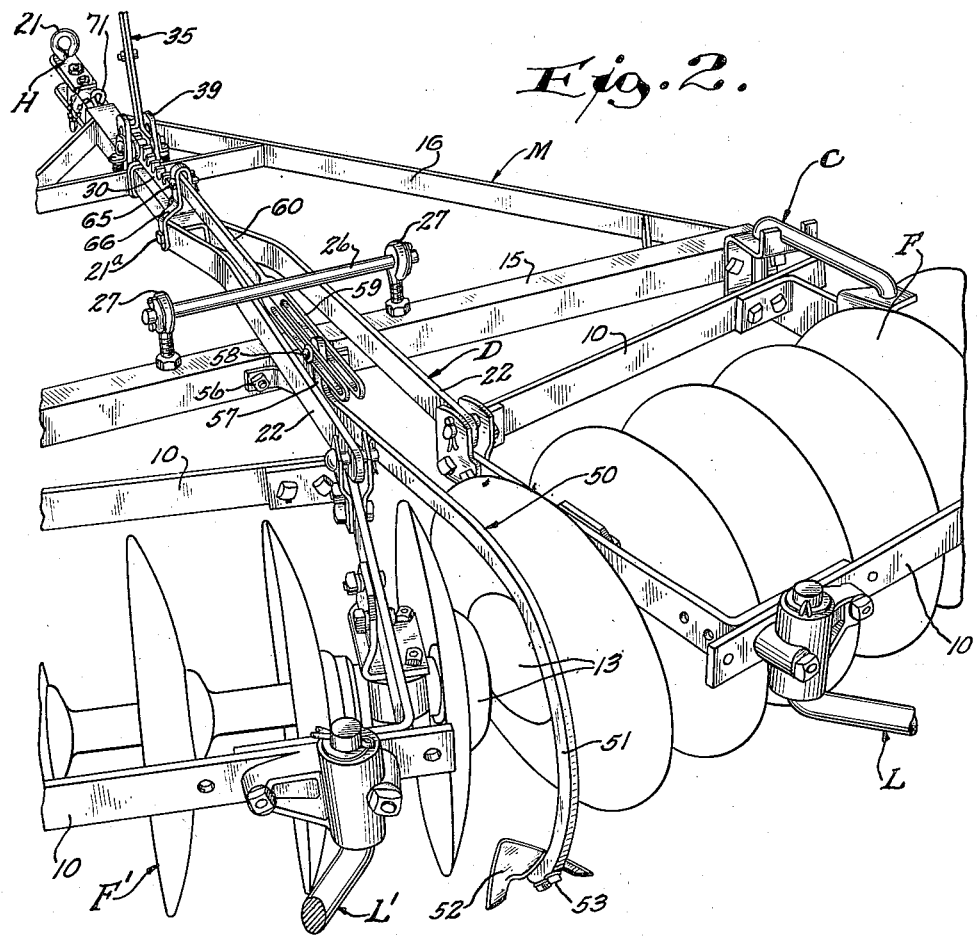
Fig. 2 is a fragmentary perspective view looking at the harrow from the rear, but omitting the rear gangs and showing, in addition to the elements mentioned in respect of Fig. 1, the center tooth and its means of attachment to the main frame and draw bar.
Figure 3:
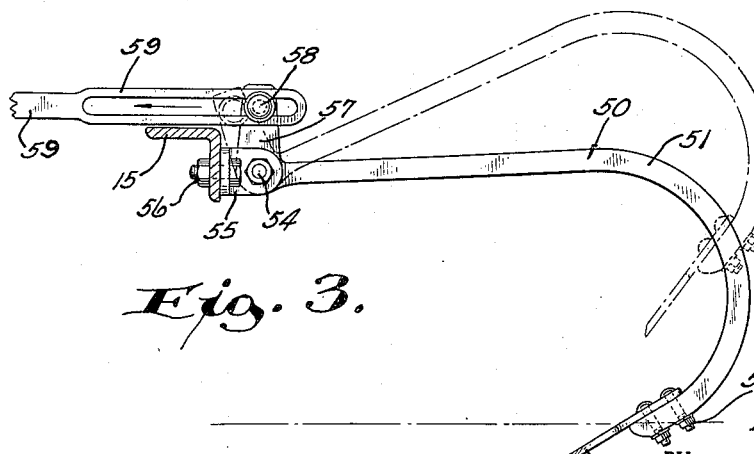
Fig. 3 is a fragmentary view partly in side elevation and partly in vertical longitudinal cross section illustrating the manner of mounting the center tooth and of controlling its raising and lowering.

Referring to the drawings it will be seen that the tractor drawn harrow embodying the present invention comprises generally a main frame designated as a whole at M, a draw bar similarly designated at D, and a hitch H at the forward end of the draw bar adapted to be interconnected with the tractor so that the harrow may be pulled or pushed thereby.

Attached to the main frame is a pair of front gangs designated at F and F'. Rear gangs designated as a whole at R and R' are dragged by the front gangs through the medium of links L and L' and braces B and B'.

The gangs F, F', R and R' are all of similar construction. Each includes a rectangular frame 10 preferably constructed of strap iron. In each rectangular frame 10 an axle 11 is journaled for rotation. On the axle 11 harrow disks 12 are supported in the usual way and are spaced by the usual spacers. At its outer ends the axle has nuts or other suitable means for preventing its axial displacement with respect to the harrow disks and for clamping the latter and their spacers together in well-known manner. The inner ends of the axles 11 of the front gangs are equipped with the usual bumpers 13. The frames of the rear gangs R and R' are interconnected by an arched coupling 14.

The front gangs F and F' are interconnected with the main frame M by connections designated at C and C'. These connections need not be described in detail as they are the same as those shown in the United States Letters Patent No. 1,967,493 granted July 24, 1934 to Joseph E. Boda for a disk harrow. As will be understood from the reference made, these connections C and C' serve to appropriately connect the outer front corners of the frame 10 of the front gangs to the outer ends of the transverse member 15 of the main frame M. The main frame M is constituted of the transverse member 15 and converging bars 16 fixed at their rearward ends to the opposite ends of the transverse member 15 and fixedly secured in any suitable way, at their forward ends to a box-like or tubular structure 17, the longitudinal dimensions of which are illustrated to advantage in Figs. 1 and 4. Its square or box-like cross section is illustrated advantageously in Fig. 5.

The draw bar D is constituted of an elongated box-like tubular structure 18, similar in many respects to the tubular box-like structure 17 of the main frame M, but differing in that it is much longer and that, although of the same square or box-like cross section, it is smaller in its dimensions so that it is adapted to telescope or slidably interfit with the box-like structure 17 of the main frame M as illustrated to advantage in Figs. 1, 4 and 5. The forward end of the box-like structure 18 of the draw bar D is bolted as at 19 to plates 20 which are apertured to receive the pin 21 of the hitch H.

The rearward end of the box-like structure 18 of the draw bar D is pivotally interconnected as at 21a to the forward ends of a pair of pull links 22. The rearward ends of these pull links 22 are pivotally connected as at 23 to attaching lugs 24 which are securely fastened as at 25 to the inner forward corners of the frames 10 of the front gangs.

The pull links 22 ride over the top of the transverse member 15 and of the main frame M. They are restrained in their action by a hold-down rod 26, the ends of which extend through the apertures of eye bolts 27. The threaded shanks of the eye bolts 27 pass through bolt holes in the transverse member 15 of the main frame and have lock nuts 28 threaded thereon and engaging the transverse member 15 to releasably secure the eye bolts 27 in any selected vertical adjustment. In this arrangement necessary clearance is provided and at the same time the frames of the front gangs are properly held down to minimize the tendency of the ground reaction to cause the front gangs to run too deep at their outer ends and too shallow at their inner ends.

Means is provided to releasably secure the draw bar and the main frame in various relative fore and aft positions, so that the draw bar and main frame may be secured in a position wherein the gangs are in transverse alignment and positioned for transport, or in a number of various angular relationships suitable for the tilling of the ground required by particular field conditions. This means includes a keeper bar 30 having its rearward end welded as at 31 to the elongated tubular structure 18 of the draw bar. The keeper bar 30 is so welded to the structure 18 that it is spaced slightly above the same, that is, so positioned vertically that it overlies the tubular structure 17 of the main frame as will be well understood from an inspection of Figs. 1, 4 and 5.

The keeper bar 30 is provided with a series of longitudinally spaced notches 32. A detent or latch pin 33 is selectively engageable with these notches to secure the main frame M and draw bar D in any selected adjustment. The detent or latch pin 33 is carried by the bifurcated lower end 34 of a manually operable lever 35. The lever 35 is illustrated in detail in Fig. 7 and is generally of inverted T-shaped construction. It has an elongated handle portion 36 and a bifurcated cross member 37 at its lower end. The bifurcations of the lower cross member of the lever straddle the keeper bar 30 and thus position the latch pin or detent 33 for engagement with any one of the notches 32. The forward end or toe 38 of the cross member of the lever bears or is fulcrumed on the tubular structure 17.

The rearward ends of the bifurcations of the cross member of the lever 35 are interconnected with retractile coil springs 40 which serve to bias the lever and consequently, the latch pin or detent 33 into latching engagement with the underlying notch 32. The latch pin or detent 33 is constrained in its action by slotted lugs 39 welded at their lower ends to box-like structure 17 of the main frame M. Each spring 40 has its upper end interconnected with an attaching angle lug 41 apertured so that the latch pin or keeper 33 may pass therethrough, and the lower end of each spring 40 is interconnected with an attaching plate 43 which is shaped, as illustrated in Fig. 5, to fit snugly against the underside of the tubular structure 17. As illustrated in Fig. 7 the lever 35 may be of composite construction including two pieces suitably bolted together, and it has a rope 43a leading to a convenient point for actuation by the tractor operator.

A center tooth attachment designated generally at 50 is provided and includes the usual arched beam 51 having a digging tooth 52 bolted as at 53 to its lower end. The forward end of the beam 51 is pivotally attached as at 54 to a U-shaped bracket 55 bolted as at 56 to the transverse member 15 of the main frame M. The beam 51 of the center tooth 50 has an integral upstanding lever arm 57 at its forward end. A pivot pin 58 is carried by the upper end of the lever arm 57 and extends through elongated slots 59 provided in the bifurcated rearward portion of a center tooth control lever 60.

The forward end of the control link 60 is pivotally attached as at 65 to a stirrup shaped bracket 66, the legs of which are interconnected by the same bolt and nut which connects the box-like structure 18 to the links 22 of the draw bar owing to the fit of bracket 66 about structure 18 and links 22, bracket 66 is, to all practical intents, rigidly fixed with portion 18 so that fore and aft movement thereof will cause corresponding movement of link 60.

With this construction and organization, when the gangs are shifted under the power of the tractor slotted portion 59 plays freely about pivot 58 so that point 52 is unaffected, but when the gangs are shifted to a transport position, then the center tooth 52, due to the pin and slot connection between its beam and its control link being too short to provide for this extreme movement, is abruptly raised to a position where it will not dig into the ground. In all angled positions of the harrow, point 52 is lowered, as will be apparent.

To provide for facility of resetting of the draw bar and main frame for tilling positions, the box-like structure 18 of the draw bar is drilled or otherwise provided with a plurality of longitudinally spaced holes 70 in its upper and lower walls. A pin 71 is provided and is adapted to be inserted in any one of the pairs of longitudinally spaced holes in the upper and lower walls of the tubular structure 18 of the draw bar D so that it may abut the forward end of the tubular structure 17 of the main frame M.

With this construction and organization, when the proper degree of angle for the gangs for local operations is established, the pin 71 may be placed in its proper position, whereupon the proper angle for tilling may be reached promptly, repeatedly and with assurance, merely by pulling the rope 43a and backing the tractor. This can, of course, be done without paying any particular attention to the selection of the notch 32 with which the pin 33 is to be engaged to hold the main frame and draw bar against relative fore and aft movement.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What I claim is:

1. A harrow comprising a main frame, gangs of disk harrows interconnected therewith, a draw bar having a hitch at its forward end adapted to be connected to a tractor, connections between the rearward end of the draw bar and the gangs, slidably interconnected tubular formations on the main frame and draw bar to provide for relative fore and aft adjustment thereof whereby the gangs may be adjusted under the power of the tractor from tilling to transport position and vice versa, manually operable means for releasably securing the draw bar and main frame in their various selected fore and aft adjustments, and comprising a notched keeper bar carried by the tubular formation of the draw bar and overlying the tubular formation of the main frame, a lever fulcrumed on the tubular formation of the main frame, and a latch pin carried by the lever and selectively engageable with the notches of the keeper bar.

2. A harrow comprising a main frame, gangs of disk harrows interconnected therewith, a draw bar having a hitch at its forward end adapted to be connected to a tractor, connections between the rearward end of the draw bar and the gangs, slidably interconnected tubular formations on the main frame and draw bar to provide for relative fore and aft adjustment thereof whereby the gangs may be adjusted under the power of the tractor from tilling to transport position and vice versa, manually operable means for releasably securing the draw bar and main frame in their various selected fore and aft adjustments, and comprising a notched keeper bar carried by the tubular formation of the draw bar and overlying the tubular formation of the main frame, a lever fulcrumed on the tubular formation of the main frame, and a latch pin carried by the lever and selectively engageable with the notches of the keeper bar, together with spring means for biasing the latch pin into latching engagement with the notches of the keeper bar.

3. A harrow comprising a main frame, gangs of disk harrows interconnected therewith, a draw bar having a hitch at its forward end adapted to be connected to a tractor, connections between the rearward end of the draw bar and the gangs, slidably interconnected tubular formations on the main frame and draw bar to provide for relative fore and aft adjustment thereof whereby the gangs may be adjusted under the power of the tractor from tilling to transport position and vice versa, manually operable means for releasably securing the draw bar and main frame in their various selected fore and aft adjustments, and comprising a notched keeper bar carried by the tubular formation of the draw bar and overlying the tubular formation of the main frame, an inverted T-shaped lever having the forward end of its cross member fulcrumed on the tubular structure of the main frame, a transversely disposed latch pin carried by the rearward end of said cross member and selectively engageable in the notches of the keeper bar, slotted guide lugs carried by the tubular formation of the main frame and coacting with the latch pin to constrain it to its proper movements, and spring means coacting with the latch pin to bias it into engagement with the notches of the keeper bar.

4. A harrow comprising a main frame including a transverse frame member and forwardly converging side members interconnected at their forward ends by a tubular box-like construction, gangs of disk harrows, each including a frame, an axle journaled in each frame and disks mounted on the axles, connections between the outer front corners of the frames of the gangs and the outer ends of the transverse member of the main frame, a draw bar having a tubular box-like structure at its forward end slidably interfitted with the tubular box-like structure of the main frame, a hitch at the forward end of the tubular box-like structure of the draw bar adapted to be connected to a tractor and pull links having their forward ends pivotally connected to the rearward end of the box-like structure of the draw bar and having their rearward ends pivotally connected to the inner front corners of the frames of the gangs.

5. A harrow comprising a main frame including a transverse frame member and forwardly converging side members interconnected at their forward ends by a tubular box-like construction, gangs of disk harrows, each including a frame, an axle journaled in each frame and disks mounted on the axles, connections between the outer front corners of the frames of the gangs and the outer ends of the transverse member of the main frame, a draw bar having a tubular box-like structure at its forward end slidably interfitted with the tubular box-like structure of the main frame, a hitch at the forward end of the tubular box-like structure of the draw bar adapted to be connected to a tractor and pull links having their forward ends pivotally connected to the rearward end of the box-like structure of the draw bar and having their rearward ends pivotally connected to the inner front corners of the frames of the gangs, said pull links overlying the transverse member of the main frame, and an adjustable hold-down carried by the transverse member of the main frame and cooperable with said pull links.

6. A harrow comprising a main frame including a transverse frame member and forwardly converging side members interconnected at their forward ends by a tubular box-like construction, gangs of disk harrows, each including a frame, an axle journaled in each frame and disks mounted on the axles, connections between the outer front corners of the frames of the gangs and the outer ends of the transverse member of the main frame, a draw bar having a tubular box-like structure at its forward end slidably interfitted with the tubular box-like structure of the main frame, a hitch at the forward end of the tubular box-like structure of the draw bar adapted to be connected to a tractor and pull links having their forward ends pivotally connected to the rearward end of the box-like structure of the draw bar and having their rearward ends pivotally connected to the inner front corners of the frames of the gangs, said pull links overlying the transverse member of the main frame, an adjustable hold-down carried by the transverse member of the main frame and cooperable with said pull links, and comprising a hold-down rod straddling the pull links, eye bolts supporting the ends of the hold-down rod and nuts adjustably interconnecting the eye bolts with the transverse member of the main frame.

7. A harrow including a main frame, gangs of harrows each including substantially rectangular frames, axles rotatably journaled therein, and disks mounted on said axles, connections between the outer corners of the frames of the gangs and the main frame, a draw bar having a hitch at its forward end adapted to be attached to a tractor and having its rearward end attached to the inner corners of said gang frames, said main frame having a tubular interconnecting structure at its forward end, said draw bar having an elongated tubular structure at its forward end telescopically interfitted with the tubular structure of the main frame, and manually operable means for releasably securing the tubular interfitted structures of the draw bar and main frame in a plurality of fore and aft adjustments.

8. A harrow including a main frame, gangs of harrows each including substantially rectangular frames, axles rotatably journaled therein, and disks mounted on said axles, connections between the outer corners of the frames of the gangs and the main frame, a draw bar having a hitch at its forward end adapted to be attached to a tractor and having its rearward end attached to the inner corners of said gang frames, said main frame having a tubular interconnecting structure at its forward end, said draw bar having an elongated tubular structure at its forward end telescopically interfitted with the tubular structure of the main frame, manually operable means for releasably securing the tubular interfitted structures of the draw bar and main frame in a plurality of fore and aft adjustments, and comprising a keeper bar having its rearward end secured to the tubular structure of the draw bar and having its body portion extending forwardly and overlying the tubular structure of the main frame, said keeper bar having a plurality of longitudinally spaced notches, a hand operated lever pivotally mounted on the tubular box-like construction of the main frame, and having a latch pin selectively engageable with the notches of the keeper bar.

9. A harrow comprising a main frame, gangs of disk harrows interconnected therewith, a draw bar having a hitch at its forward end adapted to be connected to a tractor, connections between the rearward end of the draw bar and the harrow gangs, slidably interconnected tubular formations on the main frame and draw bar to provide for relative fore and aft adjustment thereof, whereby the gangs may be positioned under the power of the tractor from tilling to transport position, and also vice versa; in combination with a center tooth having an arched beam and a ground digging tooth, means pivotally interconnecting the forward end of the beam with the main frame, and a draw link attached at its rearward end to the beam of the digging tooth, and pivotally attached at its forward end to the tubular structure of the draw bar.

10. A harrow comprising a main frame, gangs of disk harrows interconnected therewith, a draw bar having a hitch at its forward end adapted to be connected to a tractor, connections between the rearward end of the draw bar and the harrow gangs, slidably interconnected tubular formations on the main frame and draw bar to provide for relative fore and aft adjustment thereof, whereby the gangs may be positioned under the power of the tractor from tilling to transport position, and also vice versa; in combination with a center tooth having an arched beam and a ground digging tooth, means pivotally interconnecting the forward end of the beam with the main frame, a draw link attached at its rearward end to the beam of the digging tooth, and pivotally attached at its forward end to the box-like structure of the draw bar, said draw link having a pin and slot connection with the beam of the center tooth so as to abruptly raise the same for transport.

11. A harrow comprising a main frame, gangs of disk harrows interconnected therewith, a draw bar having a hitch at its forward end adapted to be connected to a tractor, connections between the rearward end of the draw bar and the harrow gangs, slidably interconnected portions on the main frame and draw bar to provide for relative fore and aft adjustment thereof whereby the gangs may be adjusted under the power of the tractor from tilling position wherein the gangs are in the angular relationship suitable for the tilling of the ground required by particular field conditions to transport position wherein the gangs are in transverse alinement, and vice versa, and manually operable latch means on one of said slidably interconnected portions and extended to a position for operation from the tractor for releasably securing the draw bar and main frame in a plurality of selected fore and aft adjustments; in combination with abutment means on the other slidably interconnected portion adjustable to a plurality of selected positions for engagement with the first slidably interconnected portion for arresting the sliding movement in one or another of the selected fore and aft adjustments defined by said latch means for facilitating the resetting of the draw bar and main frame to tilling position promptly upon backing of the tractor.

12. A harrow comprising a main frame, gangs of disk harrows interconnected therewith, a draw bar having a hitch at its forward end adapted to be connected to a tractor, connections between the rearward end of the draw bar and the harrow gangs, slidably interconnected tubular formations on the main frame and draw bar to provide for relative fore and aft adjustment thereof whereby the gangs may be adjusted under the power of the tractor from tilling position wherein the gangs are in the angular relationship suitable for the tilling of the ground required by particular field conditions to transport position wherein the gangs are in transverse alinement, and vice versa, and manually operable latch means on one of said tubular formations and extended to a position for operation from the tractor for releasably securing the draw bar and main frame in a plurality of selected fore and aft adjustments; in combination with stop means cooperable with said latch means for facilitating the resetting of the draw bar and main frame to tilling position inclusive of a pin engageable with the forward end of the main frame, said draw bar having a plurality of longitudinally spaced holes in which said pin is insertable, said holes being spaced so that said pin will arrest sliding movement of said main frame in one or another of a plurality of positions to determine a selected tilling position for engagement of said latch upon backing of the tractor.

13. A harrow comprising a main frame, gangs of disk harrows interconnected therewith, a draw bar having a hitch at its forward end adapted to be connected to a tractor, connections between the rearward end of the draw bar and the gangs, slidably interconnected portions on the main frame and draw bar to provide for relative fore and aft adjustment thereof, whereby the gangs may be adjusted under the power of the tractor from tilling to transport position and vice versa, manually operable means for releasably securing the draw bar and main frame in their various selected fore and aft adjustments and comprising a notched keeper bar carried by the draw bar, an inverted T-shaped lever having the forward end of its cross member fulcrumed on the main frame, a transversely disposed latch pin carried by the end of said cross member remote from the fulcrum point of said cross member, said latch pin being selectively engageable in the notches of the keeper bar, slotted guide lugs carried by the main frame and co-acting with the latch pin to constrain it to its proper movements, and spring means co-acting with the latch pin to bias it into engagement with the notches of the keeper bar.

14. A harrow comprising a main frame including a transverse frame member, gangs of disk harrows having disk harrow frames interconnected therewith, a draw bar having a hitch at its forward end adapted to be connected to a tractor, slidably interconnected portions on the main frame and draw bar to provide for relative fore and aft adjustment thereof whereby the gangs may be adjusted under the power of the tractor from tilling to transport position and vice versa, connections between the outer front corners of the gang frames and the outer ends of the transverse member, pull links having their forward ends pivotally connected to the rearward ends of the draw bar and having their rearward ends pivotally connected to the inner front corners of the gang frames, said pull links overlying the transverse frame member, and an adjustable hold-down carried by the transverse member and cooperable with the pull links.

ALVAH E. RUTTER.

REFERENCES CITED

The following references are of record in the file of this patent:

UNITED STATES PATENTS

| Number | Name | Date |
|---|---|---|
| Re. 22,333 | White | June 8, 1943 |
| 1,592,057 | Warne | July 13, 1926 |
| 2,052,302 | Johnson | Aug. 25, 1936 |
| 2,226,586 | Seaholm | Dec. 31, 1940 |
| 2,338,698 | White | Jan. 11, 1944 |